Sept. 1, 1959   M. B. HAMMOND ET AL   2,902,275
AIR SPRING
Filed July 10, 1956   2 Sheets-Sheet 2
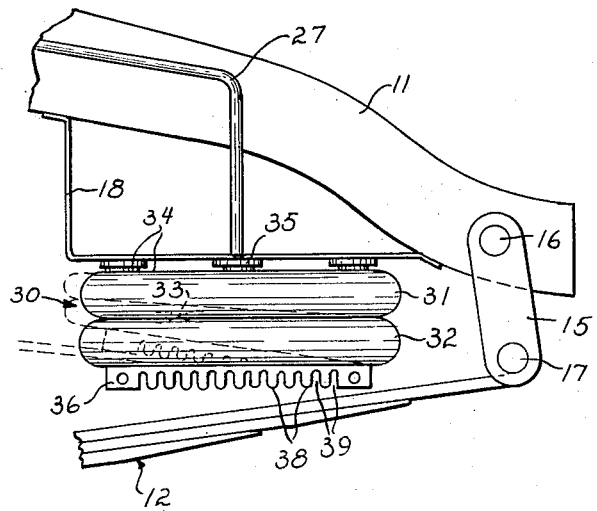
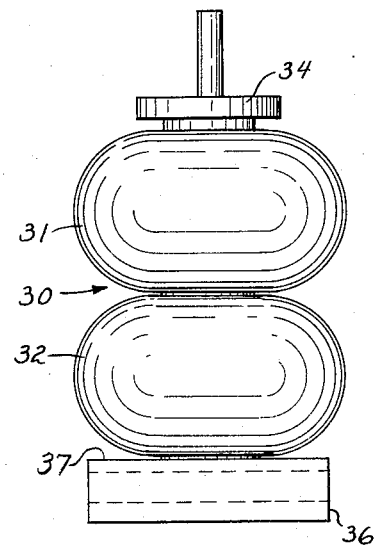
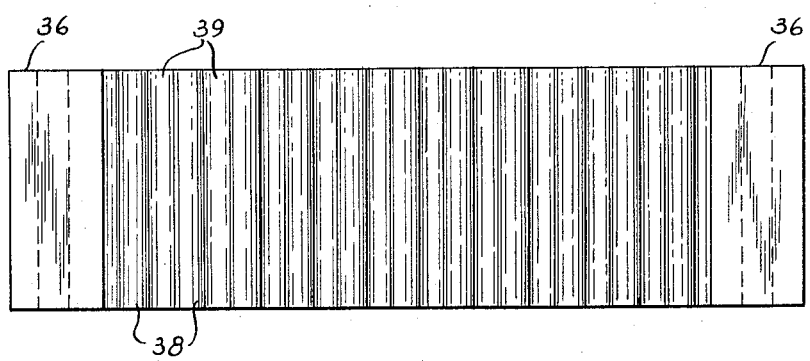
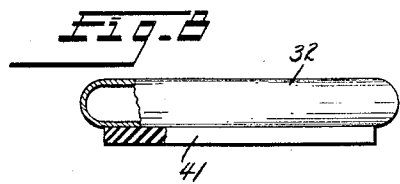
INVENTORS
MILTON B. HAMMOND
LOUIS J. HRUSOVSKY
BY Strauch, Nolan + Neale
ATTORNEYS

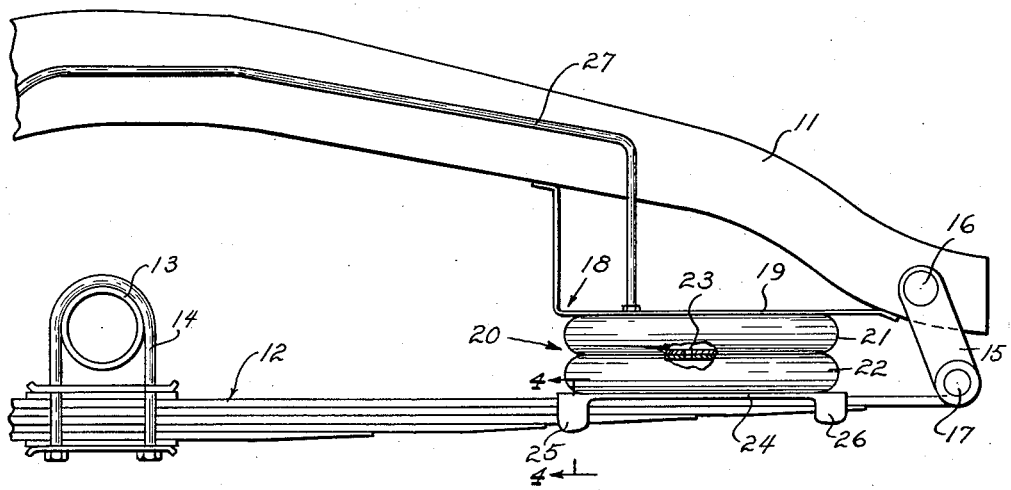
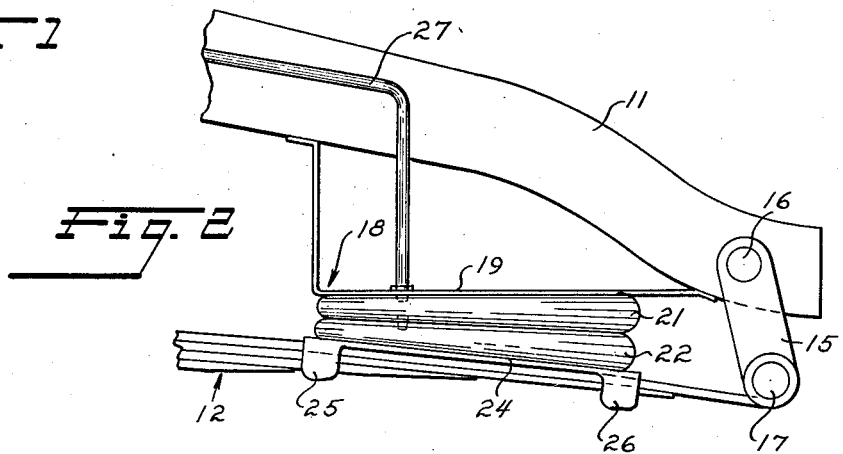
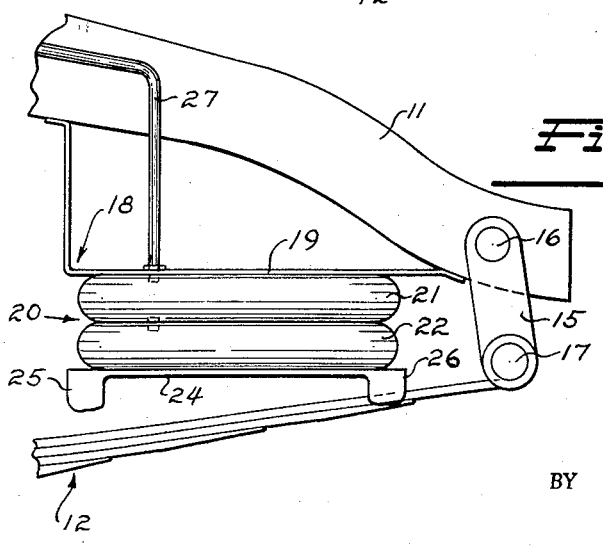
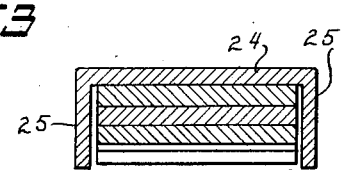

United States Patent Office 2,902,275
Patented Sept. 1, 1959

2,902,275

AIR SPRING

Milton B. Hammond, Edgeworth, and Louis J. Hrusovsky, Coraopolis, Pa., assignors to Rockwell-Standard Corporation, a corporation of Pennsylvania Application July 10, 1956, Serial No. 596,937

1 Claim. (Cl. 267—31)

This invention relates to suspension systems for automotive vehicles and is particularly concerned with leaf and pneumatic spring combinations having special structural association for efficient and long life operation.

The invention in its preferred embodiment is desirably incorporated into the combination leaf and air spring type of suspension arrangement disclosed in the copending application of Hammond and Hrusovsky, Serial No. 569,853, filed March 6, 1956, although it will be understood that it is not so limited as will be apparent in the claim. By air spring is meant any resilient walled internal fluid pressure maintained unit.

Essentially the invention here provides a flexible scuff plate on the air spring where it bears against the leaf spring in operation and this improves the operation and life of the entire assembly.

It is therefore the major object of the invention to provide a novel air spring unit having a flexible scuff plate.

A further object of the invention is to provide a novel suspension assembly wherein an air spring is provided with a flexible scuff plate where it slidably bears against an associated leaf spring.

Further objects of the invention will appear as the description proceeds in connection with the appended claim and the annexed drawings wherein:

Figure 1 fragmentarily illustrates in side elevation and partly in section part of a suspension including an embodiment of the invention;

Figures 2 and 3 show the air and leaf springs in different operational positions;

Figure 4 is a section through line 4—4 of Figure 3;

Figure 5 is a fragmentary view like Figure 3 but showing a different form of scuff plate on the air spring;

Figure 6 is an end view of the air spring unit of Figure 5;

Figure 7 is a bottom view showing the scuff plate structure of Figure 5; and

Figure 8 is a fragmentary view partly in section showing a further embodiment.

Figure 1 shows, for purpose of illustration of the invention, the rigid rear portion of an automobile frame 11 that is connected by a leaf spring 12 to an axle housing 13, the mid-portion of the spring being fixed to the axle housing by the usual V-bolts 14. The opposite ends of the spring 12 are connected to the frame by pivoted shackles, and only the rear shackle 15 pivoted to the frame at 16 and the spring end at 17 is shown.

A rigid bracket 18 secured upon frame 11 has a flat generally horizontal metal plate section 19. A bellows-like air spring 20 comprising two superposed elongated oval section lozenge-shaped bags 21 and 22 of synthetic rubber or other resilient air retentive elastomeric material is mounted upon plate 19 as by being vulcanized to the bottom of plate 19. The bags 21 and 22 have essentially flat top and bottom surfaces and the top surface of bag 22 is bonded to the bottom surface of bag 21 as by vulcanization, and an opening 23 is provided between the chambers of the respective bags.

Upon the bottom surface of bag 22 is bonded as by vulcanization a thin flat flexible steel plate 24 formed at opposite ends with depending side ear pairs 25 and 26 which as shown in Figure 4 laterally embrace in spaced relation the sides of the leaf spring in most operative positions. Plate 24 flexes substantially with the bottom wall of bag 22.

It will be observed that in the normal Figure 1 position of the parts the bottom of plate 24 is in full surface bearing engagement with the adjacent top surface of the main spring leaf, and with depending ears 25 and 26 extending alongside the spring leaves. During conditions where the axle drops with respect to the body as shown in Figure 3 the plate 24 may even become separated from surface engagement with the top spring leaf but mainly they are in rubbing engagement.

The air spring is illustrated as having connected thereto a conduit 27 from a suitable controlled source of compressed air whereby expansion and contraction of the air spring may be automatically effected to prevent undesirable tilting of the vehicle body relative to the frame as disclosed in said Hammond and Hrusovsky application.

Alternatively the air spring and leaf spring and shackle assembly may be like that shown in said Hammond and Hrusovsky application with the flexible scuff plate described above secured upon the bottom of the air spring in place of that of the application.

Referring to Figures 5–7 the air spring 30 comprises upper and lower oval section synthetic rubber or other resilient walled bags 31 and 32 that are elongated and have flat top and bottom surfaces as in the other embodiment. The adjacent surfaces of bags 31 and 32 are vulcanized together and a port 33 provided between the bag chambers. The top flat surface of bag 31 is vulcanized to the bracket 34 which also mounts the fitting 35 for compressed air conduit connection 27.

A flexible scuff plate 36 is fixed upon the flat bottom surface of lower bag 32, and it consists of an integral formed resilient slab of a synthetic rubber like neoprene. The rubber is preferably hard enough to be abrasion resistant. Slab 36 has a flat top surface 37 which is bonded as by adhesion or preferably by vulcanizing along the corresponding surface of lower bag 32. The bottom surface of slab 36 where it engages the top spring leaf surface is essentially transversely corrugated, being provided with a series of transversely extending round end ribs 38 spaced by transverse rounded bottom grooves 39, a structure which enhances flexibility longitudinally of the air spring but resists it laterally. The thickness of slab 36 even at the root of grooves 39 is preferably at least several times that of the walls of the bags 31 and 32 so that the slab provides a reasonably stiff but resiliently bendable rubber scuff plate all along the bottom of the air spring. One advantage of the laterally corrugated scuff plate is that it scrubs the top surface of the spring leaf in operation to prevent accumulation of dirt, and the entry of water merely lubricates the rubber surface for better bearing action.

Figure 8 illustrates a further embodiment of the invention wherein a non-corrugated slab 41 of resilient material having good longitudinal flexure but restrained lateral flexure is bonded as by vulcanization along the bottom surface of lower bag 32.

In all forms of the invention therefore there is provided a suspension, duplicated at opposite ends of the axle and not limited to front or rear axles, wherein an air spring is interposed between the vehicle frame and the upper leaf of the leaf spring assembly and a scuff plate which is resilient longitudinally of the suspension and stiff laterally of the suspension is fixed upon the bottom of the air spring for bearing and pressure contact with the leaf spring.

The invention may be embodied in other specific forms without departing from the spirit or essential characteristics thereof.

What is claimed and desired to be secured by United States Letters Patent is:

In an air spring unit, an elongated resilient-walled bag of elastomeric material having a generally flat bottom contour, and a longitudinally flexible laterally stiff scuff plate surface bonded along the bottom of said bag, said scuff plate being a slab of elastomeric material vulcanized to said bag and being transversely corrugated on its bottom surface.

References Cited in the file of this patent

UNITED STATES PATENTS

| | | |
|---|---|---|
| 1,058,412 | Cook | Apr. 8, 1913 |
| 1,062,320 | Boland | May 20, 1913 |
| 1,987,411 | Muller | Jan. 8, 1935 |
| 1,991,184 | Towner | Feb. 12, 1935 |
| 2,180,492 | Wilson et al. | Nov. 21, 1939 |
| 2,361,575 | Thompson | Oct. 31, 1944 |

FOREIGN PATENTS

| | | |
|---|---|---|
| 231,960 | Great Britain | Apr. 16, 1925 |
| 595,490 | Germany | Apr. 12, 1934 |
| 508,623 | Great Britain | July 4, 1939 |